US007367888B1

(12) United States Patent
Chen et al.

(10) Patent No.: US 7,367,888 B1
(45) Date of Patent: May 6, 2008

(54) PLAYER TRUST SYSTEM AND METHOD

(75) Inventors: Ling Tony Chen, Bellevue, WA (US);
Michael R. Courage, Kirkland, WA (US); Michal Bortnik, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 10/766,594

(22) Filed: Jan. 28, 2004

(51) Int. Cl.
*A63F 13/00* (2006.01)
(52) U.S. Cl. .............................. 463/42; 463/1; 463/29; 463/40; 463/41; 463/43; 709/223; 709/224; 709/225
(58) Field of Classification Search .................. 463/42, 463/25, 29, 1, 40, 41
See application file for complete search history.

(56) References Cited

U.S. PATENT DOCUMENTS

| 6,884,166 B2* | 4/2005 | Leen et al. .................... 463/16 |
| 6,899,628 B2* | 5/2005 | Leen et al. .................... 463/42 |
| 7,203,753 B2* | 4/2007 | Yeager et al. ................ 709/225 |
| 2003/0163729 A1* | 8/2003 | Buchegger .................. 713/201 |
| 2004/0242321 A1* | 12/2004 | Overton ....................... 463/29 |
| 2004/0266533 A1* | 12/2004 | Gentles et al. ................ 463/42 |

FOREIGN PATENT DOCUMENTS

WO      WO0161601 A1 *   2/2001

OTHER PUBLICATIONS

David Becker, 'Online Gaming's Cheating Heart', Jul. 25, 2001.*

Michael Bacarella, 'Anti-Cheat Mechanisms-Limited Trust in Online Gaming Communities' Dec. 21, 2002.*
Ken Jordan, Jan Hauser, Steven Faster "The Augmented Social Network: Building Identity and Trust Into the Next-Generation Internet" Jul. 1, 2003.*
Lik Mui, Mojdeh Mohfashemi, Ari Halberstadt, 'A Computational Model of Trust and Reputation' Sep. 2002 IEEE.*
Giorgas Zacharia, Alexandrous Moukas, Pattie Maes 'Collaborative Reputation Mechanisms in Electronic Market Places', Mar. 1999 IEEE.*
'Gamers Can Now Play Unreal Tournament and Unreal Tournament 2003 Against Each Other To Win Money at Ultimate Arena' PR Newswire, New York: Jul. 15, 2003.*

(Continued)

*Primary Examiner*—John Hotaling
*Assistant Examiner*—Christopher H Bond
(74) *Attorney, Agent, or Firm*—Workman Nydegger

(57) ABSTRACT

A trust rating factor (TRF) based upon data collected for players participating in previous online games sessions is used in determining official results for an online game session when different results are reported by the participants. Counters corresponding to each of a plurality of parameters related to conditions that arise during or at the end of a game session are employed in determining the TRF for each player. For example, if one of the players may have experienced a packet bombing that interrupted normal data communication, a counter related to that condition will be incremented for all players in the game session. If all of the players report results that are consistent at the end of the game session, the TRF of each player is improved. A separate TRF is determined for each game title in which a player participates.

37 Claims, 7 Drawing Sheets

OTHER PUBLICATIONS

Josep Pujol, Ramon Sangüesa, Sordi Delgado, 'Extracting Reputation in Multi Agent Systems by Means of Social Network Topology' 2000.*

Jordi Sabater & Carles Sierra 'Reputation and Social Network Analysis in Multi-Agent Systems' 2002.*

Jordi Sabater, Carles Sierra REGRET: A Reputation Model for Gregarious Societies Sep. 13, 2002.*

Jianxin Jeff Yan, Hyun-Jin Choi, "Security Issues in Online Games." The Electronic Library. Oxford: 2002 vol. 20, Iss. 2; p. 125, 10 pgs.*

Nick Patience, "Epinions Launches Online Shopping Guide Built on Trust", Computergram International, Sep. 10, 1999.* epinions.com →FAQS→The Web of Trust.*

* cited by examiner

PLAYER TRUST SYSTEM AND METHOD

FIELD OF THE INVENTION

The present invention generally pertains to collecting information that relates to the sportsmanship and trustworthiness of a player of online games to establish a trust rating for the player, and more specifically, pertains to collecting trust data for players participating in online games for use in determining the official outcome of an online game session or tournament when different results are reported or one or more players has failed to remain in data communication with the other players during the online game session.

BACKGROUND OF THE INVENTION

Typically, when players compete in an online electronic game, there is little question about the results. If the software executed by each player participating in a game reports results to a gaming service, the results reported by each player's game console or computing device should be identical. However, various problems can cause different results to be reported by different game consoles. For example, a player's game console can be disconnected from the network or otherwise become unable to communicate with the game consoles being used by at least some of the other players participating in the game through no fault of the player. As a result, the online game software running on that player's game console may determine that the other players have disconnected from the game session and not report results for the players on the game console(s) with which communication was lost. If communication was lost with all other game consoles, but not the gaming service, the online game software executed on the player's game console will conclude that the player is the winner by default. Similarly, the online game software executing on the other players' game consoles will likely determine that the player on the game console with which communications was lost simply decided to stop playing the game and will award the winning slot to a different player who has remained in communication.

Indeed, the disconnection of a game console may be intentional. A player may become disheartened during the game session because the player is losing badly. The loss of reputation and standing in the gaming community may provide considerable incentive for a player to simply disconnect or even cheat during a game session in an attempt to avoid a loss in the game session from being reported against the player. In this case, the other players will report that the disconnected player has stopped playing. The player who quit may assert that network conditions precluded the player from communicating, and may even assert that all of the other players quit the game session. Clearly, such behavior should be detected so that erroneous results are not recorded for the game session.

Of greater concern are acts committed by a player to cheat when playing an online game that are intended to cause the cheating player to be viewed as a winner. Certain techniques used by a cheating player may cause the online game software running on the cheating player's game console to conclude that the cheating player is the winner of the game session and to report erroneous results to a gaming service. The game consoles used by non-cheating players will report different results.

There are various techniques that can be used to cheat during an online game. For example, a player can use another personal computer (PC) to flood one or more other players' Internet addresses with data packets—a technique which is called "packet bombing." To be successful in this manner of cheating, the cheating player must have a substantially greater upload bandwidth than the download bandwidth of the player being packet bombed. The flood of incoming data packets prevents the player being packet bombed from receiving and sending transmission control protocol (TCP) data from either the gaming service or other players. Since successful communication from an affected player's game console to the gaming service using TCP requires an acknowledgement to be received from the gaming service, the packet bombing affectively interrupts all TCP communications. The cheating player intends that the player being packet bombed will appear to have disconnected from the game session, so that the affected player will not have any chance of winning, and so that other players' game consoles will indicate that the player being packet bombed appeared to quit the game session before it was finished.

Another type of cheating can occur if a player employs a network traffic analyzer to apply selective packet filtering to block traffic from other players, so that it seems the other players have disconnected from the online game session. The cheating player's software will then report to the gaming service that the cheater has won because the player(s) who were filtered failed to finish the game. Because the software on the game consoles of the other players who are blocked by the packet filter will perceive that the cheating player has stopped communicating and has apparently dropped out of the game, the game software on these other game consoles will report game results indicating that the cheating player disconnected and did not finish the game. As a result, the gaming service receives very different reports from the game consoles at the end of the game session.

While a cheating player may also hack (modify) game software to cause it to report an erroneous result or to provide some advantage to the player using the hacked game software, it is possible for the gaming service to detect modified software to prevent this form of cheating. In any case, it is probably not possible to stop all forms of cheating by an online game player. However, it should be possible to identify players who consistently are involved in game sessions where different results are reported by participating players, likely as a result of cheating, so that the players who consistently cheat can eventually be identified and steps taken to either prevent them from using the online gaming service to play online games. At the very least, the gaming service may choose to regard any results that players who have been identified as cheaters report as suspect, so that much less weight is applied to their reports than to the reports of other players who have not been identified as potential cheaters.

Thus, the problem of determining the results for a game session that should be accepted as the final official results needs to be addressed so that players are not left with an indefinite conclusion to a game session. Also, if possible, it would be desirable to detect whether a player has simply disconnected from a game session, or has been the subject of a packet bombing (flooding) attack that prevented the player from communicating with other players during a game session, or with a gaming service to report the results at the end of the game session. These and other functions should be implemented by the gaming service in cooperation with online games that are written so as to assist the gaming service in this endeavor.

Correctly determining the official results of a game session is particularly important in tournaments, where one player in a match must expeditiously be declared a winner in a game session in order to advance in the standings of the tournament and be matched with another player for the next level of play. Errors or delays in determining the official results will adversely impact on the quality of play by all players and may cause subscribers to a gaming service to become dissatisfied. If only two players (or two groups of players) are competing in a tournament or other online game, and if two or more different results are reported, it is very important that the gaming service have an appropriate procedure in place for deciding the results that will be accepted as the official results for the game session.

It would be preferable to track the history of each player using data maintained by the online gaming service to determine whether a player is likely cheating, based upon the history for the player and involvement in previous games sessions where problems arose because different results were reported or other issues concerning the play of the online game have arisen, and to employ the historical data for each player competing when determining the results to accept as the official results for an online game session. Currently, online gaming services tend to essentially "flip a coin" or use some other random solution in determining a winner when game session results reported by players or game consoles are inconsistent or differ. Accordingly, a more refined approach in making such determinations should result in a more equitable solution and enable appropriate action to be taken in regard to players identified as cheaters, particularly, when it appears that the players may have been packet bombing or applying a filter to disrupt the communications of other players during a game session.

SUMMARY OF THE INVENTION

When the results of an online game session that are reported at the end of the games session do not agree, it would be preferable to determine the official results based upon a level of trust associated with each of the players. This level of trust is preferably determined based upon the prior involvement of each of the players in previous games sessions in which there was a disagreement about the results likely caused by one or more of the players cheating in some manner or at least, disconnecting mid-game. Over time, the statistics collected on each of the players can be used to determine an objective trust rating factor (TRF), which is used in determining the official results for game sessions in which conflicting results are reported by the participants. The TRFs of the participating players are employed in accord with predefined rules to determine the official results for such game sessions.

More specifically, one aspect of the present invention is directed to a method for determining an official result for an online game session when a result is in dispute. The method includes the steps of establishing a trust rating for each player connecting to an online gaming service and participating in game sessions, based upon the prior conduct of each player when playing online games in the past. This trust rating is therefore indicative of a level of trust that is associated with each player by the online gaming service. The trust rating for each player is stored in a storage accessible by the online gaming service and is updated for a player when the player participates in successive online game sessions. Predefined rules relating to results reported by the players participating in the game session are employed for determining the official result for any game session in which a difference exists in results reported by the players, as a function of the trust ratings for the players participating in the game session.

The results for all of the players participating in a game session are required to be reported by each player participating in the game session. If the same results are reported by all of the participants in the game session, the trust ratings of all of the players in the game session are improved.

A separate trust rating is preferably maintained for each player, for each online game title in which the player participates. The step of establishing the trust rating comprises the step of changing a value of at least one of a plurality of parameters in response to a condition detected during a game session (such as a client used by a player indicating to the gaming service that the client may be unable to communicate in a normal manner with the gaming service or other clients due to being packet bombed), or after the game session is completed. Each of the plurality of parameters for a player is preferably defined by a corresponding counter, so that changing the value of at least one of the plurality of parameters simply involves the step of either incrementing or decrementing the value of at least one of the counters. The method may further include the step of applying a weighting factor to the values of the counters stored for a player in determining the trust rating of the player. A greater weighting factor might be applied for at least one of the counters in connection with the results of a tournament game session than in connection with the results of a game session that is not part of a tournament.

The predefined rules provide for reducing the trust rating for a player who starts a game session, but does not complete the game session. Also, the trust ratings of all of the players in a game session are reduced if any player indicates the client used by the player is being packet bombed, possibly by another player. To provide this indication, the client of the player being packet bombed sends a signal to the gaming service using a less preferred protocol, indicating that the player is unable to communicate with the gaming service using a signal having a preferred protocol due to the packet bombing. The step of updating the trust rating of a player comprises the step of improving the trust rating of all players participating in the game session if: (a) a majority of the players participating reported results for the game session; (b) all of the results reported by the majority are in agreement; and (c) no player has communicated with the gaming service using the signal having the less preferred protocol to indicate that the player was unable to communicate with the gaming service using the signal having the preferred protocol.

If less than the majority of players reports results for a game session, the trust rating of all of the players in the game session is reduced. Similarly, if too few (i.e., less than a predefined percentage) of the players participating in a game session reports results, the trust rating of all of the players who were originally participating in the game session is reduced.

The method further includes the step of changing the trust rating of a player as a function of time, so that more recent updates to the trust rating of the player have a greater weight in modifying the trust rating than substantially older updates.

A majority quorum for a game session is determined to exist, if a set of players report the same results, and the sum of the trust ratings of these players is greater than a predefined portion of the total trust rating for all of the players in the game session. In this case, the results reported by the majority quorum are used as the official result for the game session.

A non-majority quorum for a game session is determined to exist, if a set of players report the same results, and the sum of the trust ratings of these players in a game session is less than a predefined portion of the total trust rating for all players in the game session, but greater than a lesser predefined portion of the total trust rating for all of the players in the game session. In this case, the results reported by a highest non-majority quorum are used for the official results when no majority quorum exists.

Another aspect of the present invention is directed to a memory medium on which machine executable instructions are stored for carrying out the steps of the method described above.

Yet another aspect of the present invention is directed to a server computing device at an online gaming service, which is used for determining an official result for an online game session when a result is in dispute. The server computing device includes a memory in which machine instructions are stored, a network interface adapted to communicate with clients over a network to facilitate play of online games, and a processor that is coupled to the memory and to the network interface. The processor executes the machine instructions stored in the memory to carry out a plurality of functions that are generally consistent with the steps of the method that was discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing Present Invention

Figure 1:
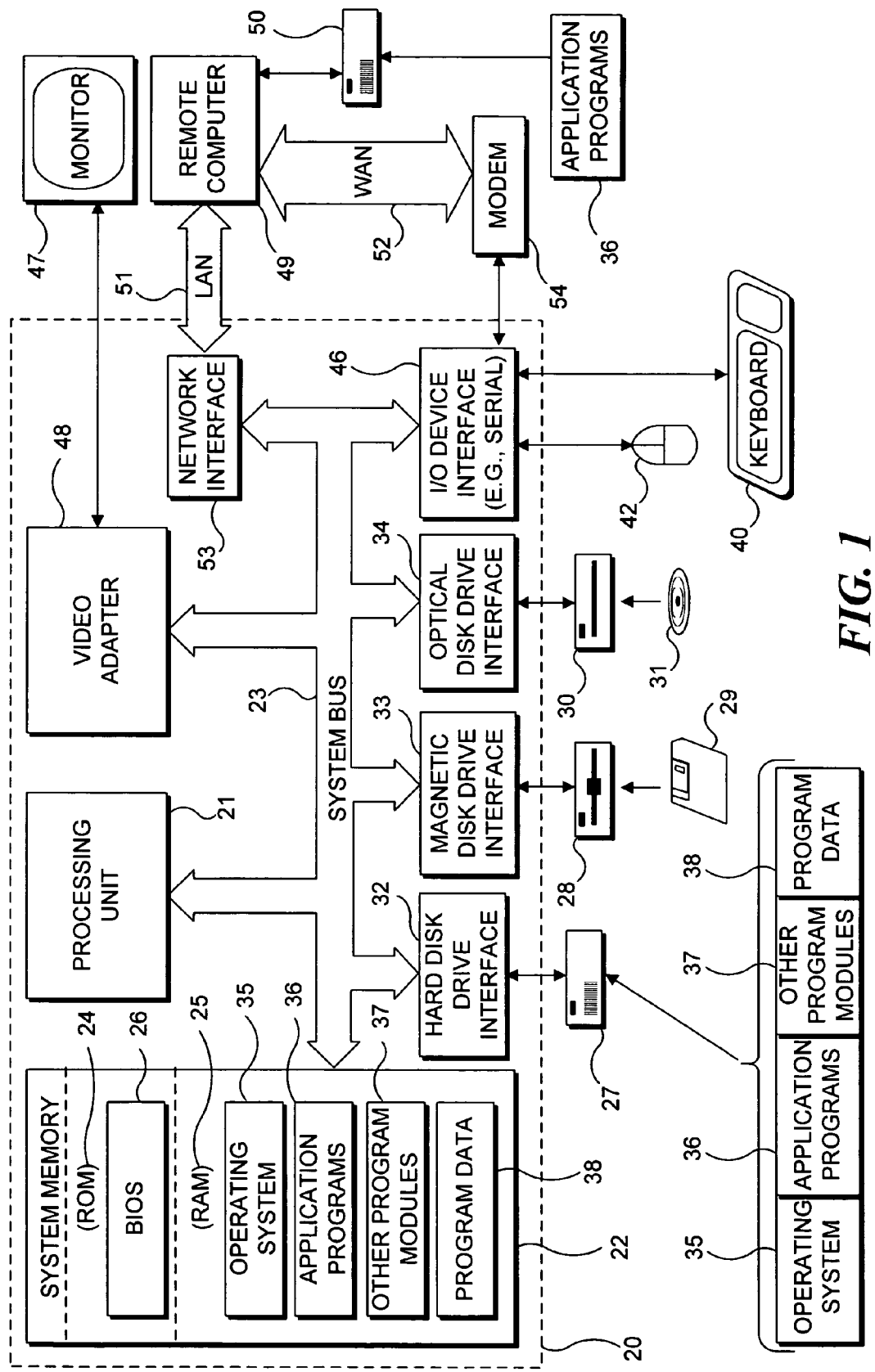
FIG. 1 is a functional block diagram of a generally conventional personal computer usable as a server at a gaming service that employs the present invention for determining the official results of a game session.

With reference to FIG. 1, an exemplary system suitable for implementing various portions of the present invention, including providing the functionality of various portions of a gaming service, such as Microsoft Corporation's XBOX LIVE™. In addition, the system shown in FIG. 1 might also be employed as a client computing device used for playing online games, as an alternative to a game console. The system includes a general purpose computing device in the form of a conventional PC 20, provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into PC 20, and provide control input through input devices such as a keyboard 40 and a pointing device 42. Pointing device 42 may include a mouse, stylus, wireless remote control, or other pointer. As used herein, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, PCs are often coupled to other peripheral output devices (not shown), such as speakers (through a sound card or other audio interface—not shown) and printers.

The present invention may be practiced on a single machine, however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links. The servers employed to provide the gaming service functions will typically comprise computing devices much like that described above, but will likely access much larger hard drives or other non-volatile memory systems for storing data about subscribing users and for other elements of the gaming service.

Exemplary Game Console

Figure 2A:
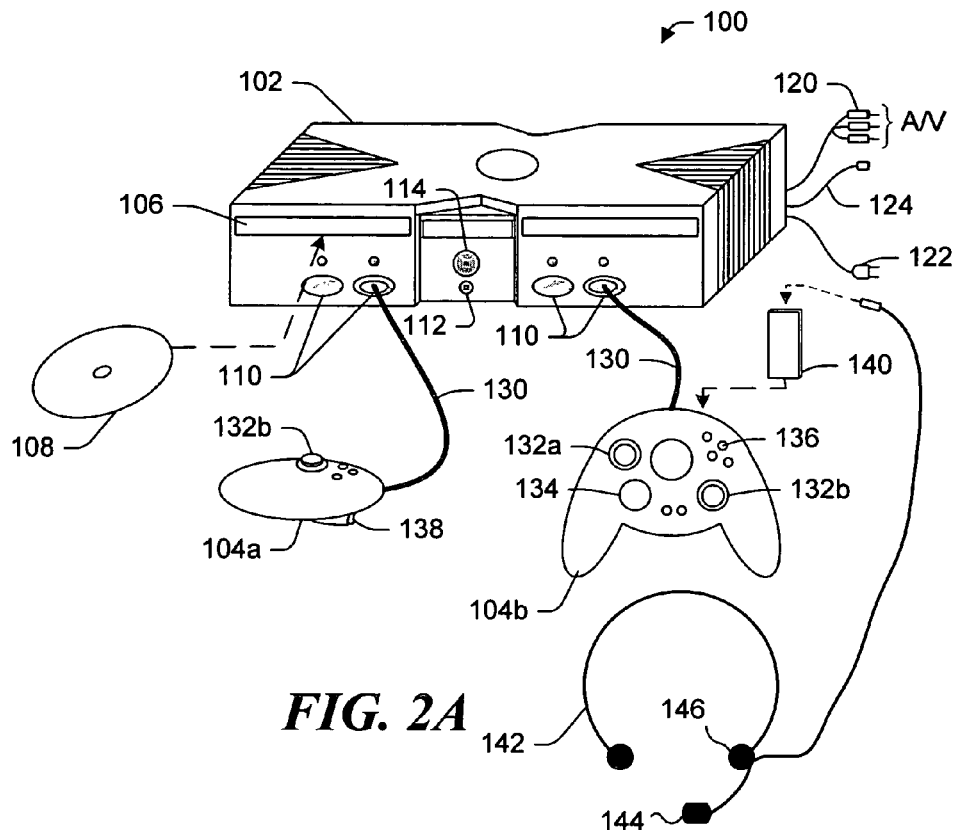
FIG. 2A is a schematic diagram illustrating a game console that is usable for playing online games by connecting to a gaming service, and which is an example of a client that reports the results of a game session to the gaming service in accord with the present invention.

As shown in FIG. 2A, an exemplary electronic gaming system 100 includes a game console 102, which is a preferred form of a client computing device for use in connection with the present invention. Game console 102 supports up to four user input devices, such as controllers 104a and 104b, and is equipped with an internal hard disk drive (not shown in this Figure) and a portable media drive 106 that supports various forms of portable optical storage media, as represented by an optical storage disk 108. Examples of suitable portable storage media include DVD disks and CD-ROM disks. In this gaming system, game programs are preferably distributed for use with the game console on DVD disks, but it is also contemplated that other storage media might instead be used, or that games and other programs can be downloaded from a gaming site over the Internet (or other network).

On a front face of game console 102 are four connectors 110 that are provided for electrically connecting to the controllers. It is contemplated that other types of connectors or wireless connections might alternatively be employed. A power button 112 and a disk tray eject button 114 are also positioned on the front face of game console 102. Power button 112 controls application of electrical power to the game console, and eject button 114 alternately opens and closes a tray (not shown) of portable media drive 106 to enable insertion and extraction of storage disk 108 so that the digital data on it can be read and loaded into memory or stored on the hard drive for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to transfer data through an Ethernet connection to a network and/or through a broadband connection to the Internet, to enable play of an online game with one or more other players who are using one or more other game consoles linked to a gaming service, such as Microsoft Corporation's XBOX LIVE™ gaming service. Alternatively, it is contemplated that a modem (not shown) may be employed to transfer data to a network and/or the Internet. As yet a further alternative, the game console can be directly linked to another game console via an Ethernet crossover cable (not shown).

Each controller 104a and 104b is coupled to game console 102 via a lead (or in another contemplated embodiment, through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 2, each controller 104a and 104b is equipped with two thumb sticks 132a and 132b, a D-pad 134, buttons 136, and two triggers 138. These controllers are merely representative, and other gaming input and control mechanisms may be substituted for or used for controlling game console 102, in addition to those shown in FIG. 2.

Removable function units or modules can optionally be inserted in to controllers 104 to provide additional functionality. For example, a portable memory unit (not shown) enables users to store game parameters and port them for play on another game console by inserting the portable memory unit in to a controller on the other console. Other removable function units are available for use with the controller. In connection with the present invention, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and a headphone 146 or other type of audio transducer for producing audible sound in response to an output signal from the game console. In another form of controller that is being contemplated (but is not shown), the voice communicator capability is included as an integral part of a controller that is generally like controllers 104a and 104b in other respects. The controllers illustrated in FIG. 2A are configured to accommodate two removable function units or modules, although more or fewer than two modules may instead be employed.

Gaming system 100 is of course capable of playing games, including online games, but can also play music, and videos on CDs and DVDs. It is contemplated that other functions can be implemented by the game controller using digital data stored on the hard disk drive or read from optical storage disk 108 in drive 106, from an online source, or from a function unit or module.

Functional Components of the Game Console

Figure 2B:
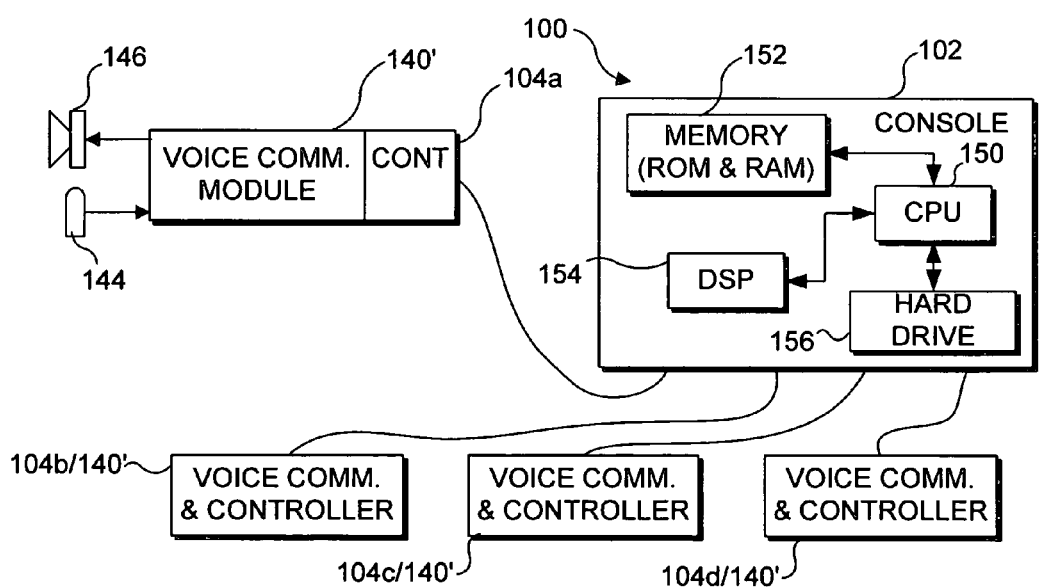
FIG. 2B is a functional block diagram of the game console of FIG. 2A, showing the controllers that are employed by up to four players in playing an online game.

Turning now to FIG. 2B, a functional block diagram illustrates, in an exemplary manner, components of the game console and components that are provided to facilitate voice or verbal communication between players during the play of electronic games on the multiplayer game console. As noted above, this embodiment of game console 100 can have up to four players on each console, and each player can be provided with a controller and voice communicator. Details of a voice communicator module 140' are illustrated in connection with its associated controller 104a. It will be understood that controllers 104b, 104c, and 104d (if coupled to game console 100) can optionally each include a corresponding voice communication module 140' like that coupled to controller 104a.

With reference to multiplayer game console 100, several key functional components are shown, although it should be understood that other functional components are also included, but not shown. Specifically, game console 100 includes a central processing unit (CPU) 150, a memory 152 that includes both ROM and RAM. Also provided is a digital signal processor (DSP) 154 and a hard drive 156. The digital signal produced in response to the analog signal from microphone 144 is conveyed through controller 104a to CPU 150, which handles encoding of the voice stream signal for transmission to other local voice communication modules and to other game consoles over a broadband connection through an Ethernet port (not shown in FIG. 3) on the game console.

Digital signals conveyed as packets over a direct or network connection are input to CPU 150 through the Ethernet port on game console 100, preferably in TCP format and are processed by the CPU to decode the data packets. Data and verbal communications over the Internet between players participating in a multiplayer game through the gaming service are not accessible by others who are simply connected to the Internet via a PC or other type of general computing device, because these communications are conducted through virtual private network (VPN) tunnels that are relatively secure. However, the address of a game console on the network can be packet bombed by a PC, or a network filter can be employed to block data packets to and from other game consoles. Both packet bombing and use of a network filter are thus forms of cheating, since they disrupt the normal data communications of a game session.

Gaming Environment

Figure 3A:
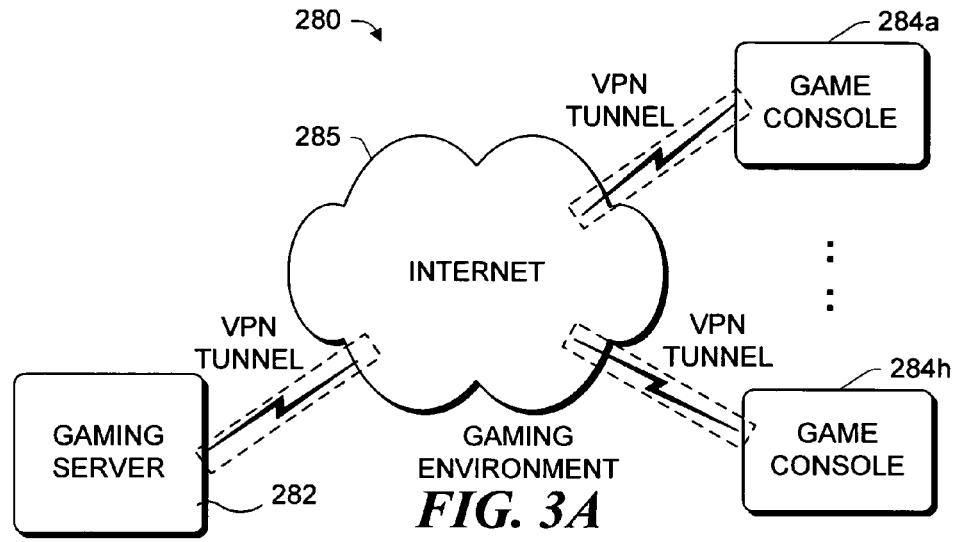
FIG. 3A is a schematic diagram of an online game environment, showing how game consoles are coupled in communication over the Internet to a gaming server that facilitates the play of a game session and determines the official results using the present invention.
Figure 3B:
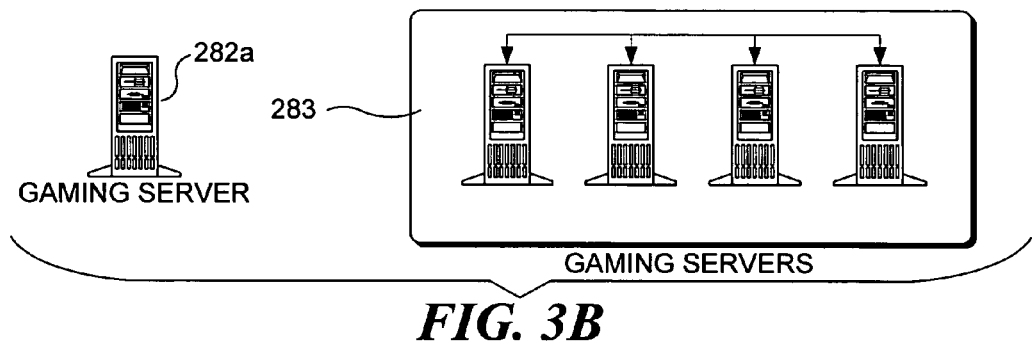
FIG. 3B is a schematic diagram illustrating how a plurality of gaming servers are employed by the gaming service to administer online games and determine and record the official results for each game session.

FIGS. 3A and 3B illustrate different aspects of the gaming environment. In FIG. 3A, a schematic diagram 280 shows that the gaming environment comprises a plurality of game consoles 284a-284h, which are connected to a gaming server 282. Data packets are preferably conveyed between the gaming server and the game consoles in TCP format through VPN tunnels, over Internet 285. Each game console 284a-284h is thus connected in secure communication with gaming server 282, which as shown in FIG. 3B may comprise a single server 282a, or alternatively and more likely, will include a plurality of servers 283 that are coupled together to carry out specific functions required for the gaming service. For example, in connection with the present invention, one of the plurality of servers will function as an arbitration server that determines the official results for game sessions of online games played using the gaming service.

Use of the VPN tunnel insures a secure communication link between each game console and the gaming service. The secure gaming environment of FIG. 3A does not provide any option for connecting a game console over the Internet to any other device and only permits communication between game consoles that are connected to the gaming service, to enable the game consoles to participate in multiplayer games. Each game console is used by at least one player participating in a multiplayer online game with one or more players on other game consoles.

Figure 4:
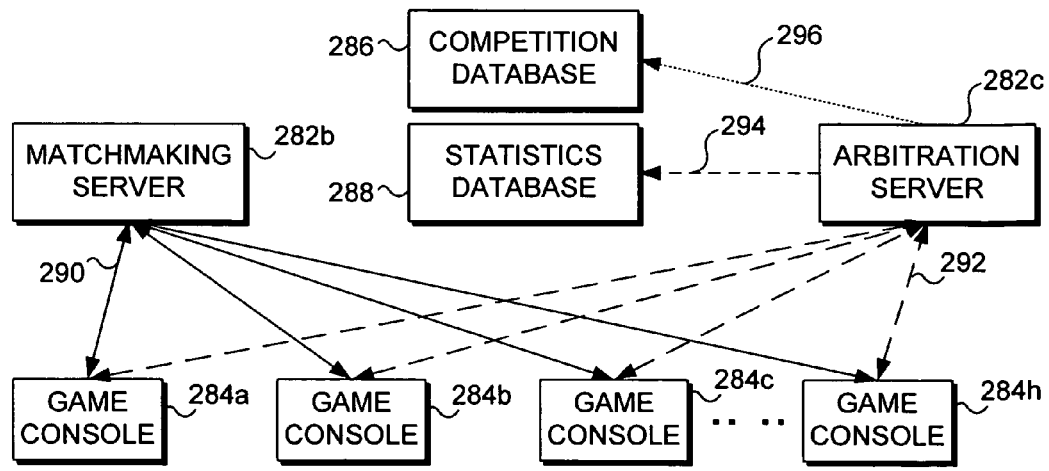
FIG. 4 is a schematic block diagram illustrating the functional components of the gaming service coupled to a plurality of game consoles.

FIG. 4 illustrates further details showing how the gaming service interacts with game consoles in connection with the present invention for determining the official results of a game session being played by a plurality of players, wherein one or more players are using each game console. Game consoles 284a-284h initially communicate with a match making server 282b over communication links 290. Match making server 282b carries out the steps involved in associating the players on each of game consoles 284a-284h in one or more game sessions. For purposes of this simplified explanation, it can be assumed that all of the game consoles are participating in a single game session. The present invention addresses one of the problems that can arise in determining the official results of the game session in the event that one or more players using one of the game consoles decides to disconnect in the middle of the game session before sending a report indicating the results for each of the players participating in the game session. A player using one of the game consoles may decide to quit in the middle of the game session because the player is losing and has no further interest in continuing. As a result, if the remaining players submit a report showing the results for all of the players who initially were participating, including the player who dropped out, an arbitration server 282c will conclude that the report should not be trusted, because the player who dropped out has not reported any results for the game session.

To remedy this problem, the present invention requires that each player participating in the game session be registered with arbitration server 282c before being permitted to participate in the game session. The online game being executed by each of game consoles 284a-284h will therefore automatically register each of the players who are initially intending to participate in the game session so that arbitration server 282c is provided that registration over communication links 292. The registration process achieves the goal of effectively "locking" a player into the game session so that a player can no longer deny involvement in the game session at a later time. Furthermore, since the registration occurs before the game playing starts, none of the players has any prior knowledge of how the game session is going to turn out and therefore, cannot selectively register only "winning" game sessions. Furthermore, during the registration process, arbitration server 282c returns an accurate list of the game consoles or clients and players who have registered up to that point, and this list is provided to the game consoles of all players before the game session, so that the online game software executing on each game console can use this information to ensure that only the players on game consoles who have registered actually participate in the game.

By using the preceding two-step process, it is now possible for the present invention to determine if the set of players reported in the results by each of the game consoles is valid. Since only players that have registered should show up in the report submitted by each game console for the results of the game session, any other player appearing in the results is considered invalid, and the results for that player are discarded. Furthermore, if fewer game consoles report results than initially registered, it will be assumed that any player using a game console that did not report results decided to disconnect during the game and not complete the game session, or was technically unable to report results.

At the end of a game session, arbitration server 282b will employ the predefined rules for determining the official results. The official results will then be stored in a competition database 286, as indicated by a link 296. In tournaments, the official results will be applied to determine the players participating in the next level of competition. Even for non-tournament games sessions, each player's ranking may be affected by the official results that are stored. If historical data used to determine a player's trust level is to be maintained, arbitration server 282b will also update the parameters used to determine the trust level and record the results over a link 294 in a statistics database 288.

Figure 8:
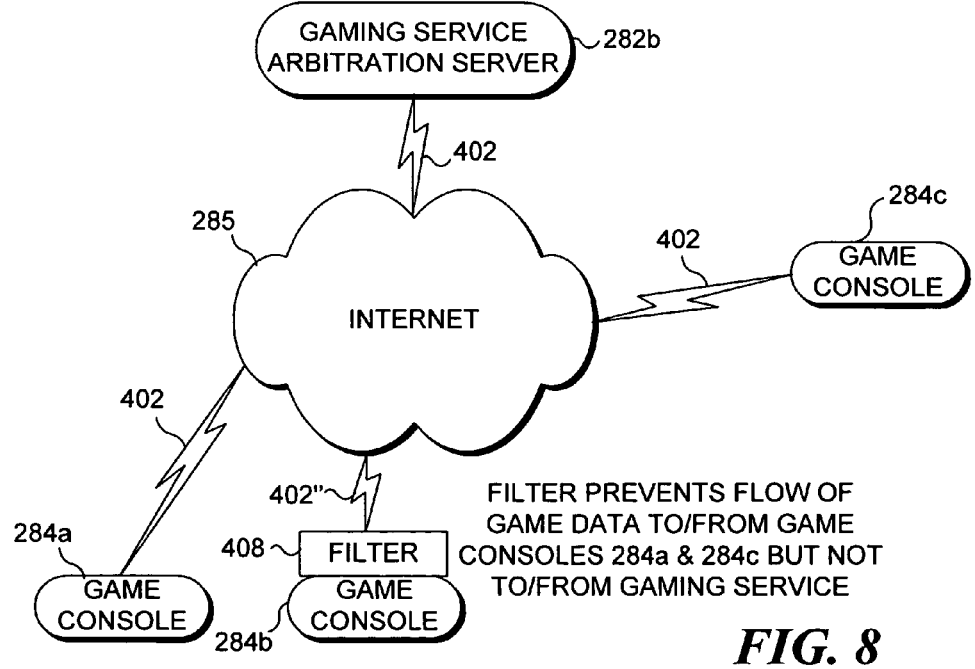
FIG. 8 is a schematic block diagram illustrating one player using a network filter to interrupt data communications with a game console used by another player in a game session.

There are other reasons why game consoles may report different results to arbitration server 282c besides a player simply deciding to disconnect the game console during a game session. For example, it is possible that a game console may still be able to communicate over link 292 with arbitration server 282c, but be unable to communicate with other game consoles during a game session. In this case, it is possible that a network filter is being used by one or more players using one of the other game consoles to block communications with selected game consoles. FIG. 8 illustrates a simple configuration in which game consoles 284a, 284b, and 284c have initially begun participation in a game session and have registered with gaming service arbitration server 282b. Initially, communication links 402 provide for communication between each of the game consoles and arbitration server 282b. However, if one or more players using game console 284b employs a network filter 408 to block communications from game consoles 284a and 284c, the online game executed on game console 284b will interpret the failed communication with the other two game consoles as possibly resulting from a decision by their players to discontinue play in the current game session and will report results to arbitration server 282b indicating only the results for the players on game consoles 284a. Also game consoles 284a and 284c will interpret the failed communication with game console 284b as possibly being due to a decision by the one or more players using game console 284b to discontinue play during the game session. Accordingly, each of game consoles 284a and 284c will report results that indicate the player(s) on game console 284b failed to complete the game session. (Note, that in some games, more than one player on a game console may be viewed as a winner.)

Arbitration server 282b must therefore determine the results that should be used as the official results for the game session when different results are reported by the online game executing on game consoles 284a and 284c, compared to the results reported by the online game executing on game console 284b. The arbitration server will be unable to determine whether a network filter was being used by the players on game consoles 284a and 284c, or, as is actually the case, by the players using game console 284b. However, arbitration server 282b will have a basis for concluding that a network filter might have been used by one or more players, since the different results reported by the game consoles indicate a disruption of communication between the game consoles initially participating in the game session. To deal with this issue, arbitration server 282b applies predefined rules to determine the official results that will be reported for the game session.

Figure 7:
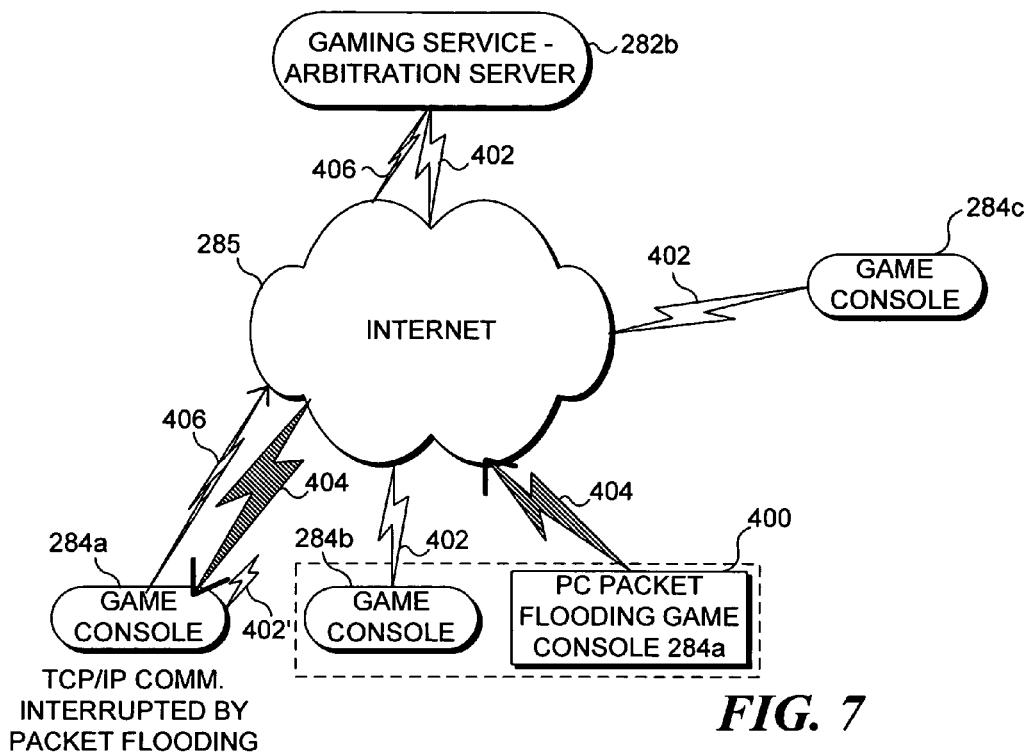
FIG. 7 is a schematic block diagram illustrating one player packet bombing or flooding the game console being used by another player in a game session.

Another reason why one or more game consoles initially participating in a game session may not report results to arbitration server 282b is illustrated in FIG. 7. Again, in this example, game consoles 284a, 284b, and 284c are participating in a game session and the players using those game consoles are initially registered. Initially, each of the participating game consoles are able to communicate over communication links 402 with arbitration server 282b. However, a player who intends to cheat is using game console 284b. This player uses a PC or other computing device 400 to transmit a very high volume of data packets over a link 404 to the Internet Protocol (IP) address of game console 284a, effectively packet bombing game console 284a. As a result of the packet bombing, game console 284a is unable to receive data packets from any other network destinations due to the bandwidth limitation it has in regard to downloading data being completely consumed by the bombing data packets. In order for this packet bombing attack to be successful, the player using game console 284b will need more upstream bandwidth than the downstream bandwidth of the player using game console 284a.

As a consequence of being packet bombed, game console 284a is not able to receive data packets from other players or the arbitration server and is also unable to use a preferred TCP format for transmitting data packets to arbitration server 282b, or to any of the other game consoles participating in the game session. Although the upstream capability of the broadband connection for data sent by game console 284a to arbitration server 282b or to the other, game consoles is not affected by the packet bombing, use of the TCP format also requires that game console 284a be able to download handshake data to successfully transmit data packets. Accordingly, the present invention provides that the online game software detect an inability to communicate over the network as a result of packet bombing, and if packet bombing is detected, the online game software will fall back to using user datagram protocol (UDP) format to send data to the arbitration server. The online game software will attempt to send a single packet with the UDP to the arbitration server over a link 406 to provide an indication that one of the other players participating in the game session may be packet bombing game console 284a Since the UDP data packet does not require any response back from the arbitration server to be successfully transmitted, the single packet will provide the necessary indication to the arbitration server to indicate that packet bombing may be used by one of the other players in the game session to interrupt communication from game console 284a. As shown in FIG. 7, a communication link 402' is effectively blocked by the packet bombing, preventing game console 284a from communicating other than through the single packet transmitted with UDP.

Arbitration server 282b cannot determine with any certainty whether a specific player or even if any player in the game session is actually the source of the packet flooding affecting game console 284a. However, if such packet flooding events occur sufficiently often over time in game sessions in which a particular player is a participant, the arbitration server can determine that the particular player is very likely the source of packet bombing of other players in game sessions.

In the present invention, each client or game console that was a participant in the game session reports the results for all of the other participants in the game session when the game session is concluded. The software for the online game is written to require the submission of this report by the game console after the game session is completed. Each report that is submitted to the arbitration server represents a perception of the results of the game in regard to all of the participating players relative to the game software executing on the game console making the report. The report includes information such as the final results of the game for all participants, an indication of whether connectivity was lost in regard to other game consoles during the game session, and a report of any suspicious activity that occurred during the game session that should not have occurred under normal circumstances. For example, the online game software will report a suspicious circumstance was detected if any of the players participating in the game session walked through a wall when players are normally unable to do so as the game software was written, or if any of the players had an unlimited source of weapons or ammunition, or energy, etc., or if any player appears to be invulnerable to the weaponry of other players. These are only a few examples of the kinds of circumstances and conditions that may be detected by online game software and included in the report made to the arbitration server. Clearly, if the reports from one or more game sessions indicate that one of the game consoles is executing modified game software, the arbitration server can take appropriate action. For example, the results of the game reported by a game console that appears to be running modified online game software may be excluded by the arbitration server in determining the official results and the players using that game console may be disqualified.

While many different approaches can be used in the software executed by the arbitration server to determine the official results for a game session, the most straightforward approach is to simply apply the results reported by a majority of the game consoles used by players participating during the game session. For example, if four game consoles are used for a game session, and three game consoles report first results while the remaining game console reports second results that are different than the first, the arbitration server can simply use the first results reported by the majority, as the official or arbitrated results for the game session. In this case, the second results reported by the single game console are simply discarded.

However, if an equal number of game consoles report two different conflicting results, some sort of tie breaking method must be employed by the arbitration server to determine the official results for the game session. One technique for deciding the official results in such a case would be to refer to the history recorded in a database for each of the players involved in submitting conflicting reports to determine which of the players has a higher trust level. By maintaining a database that records data indicative of different types of problems that have arisen in game sessions in which each player participates, the trust level or trust rating factor (TRF) of each player can be determined as a function of the various parameters previously recorded for the player. Then, for a specific game session in which the official results must be decided, the arbitration server can employ the TRF of each of the players participating in the game session to make a decision as to which results reported by the game consoles used by the players will be employed for the official results for the game session.

Over time, a player who consistently cheats will build up a history in the database of frequently being involved in game sessions and will have a lower TRF than a player who does not cheat and is only occasionally involved in game sessions where there appears to be a dispute in regard to the results (i.e., if the honest player happens to become matched with a cheating player). Clearly, when only two players are participating, and a difference in the results of the game session are reported by the game consoles used by each, the player who has been involved in fewer (percentage-wise) disputes in the past regarding the results reported will have a higher TRF and be more trusted than the other player, and therefore, the results reported by the player with the higher TRF will be used as the official results for the game session determined by the arbitration server.

To ensure that the historical data are correctly maintained in regard to each of the players participating in a game session, it is important that a robust and strong authentication system be used when a game console initially connects to the gaming service and a player who is a subscriber signs on to the gaming service to play online games during a current connection. It is also important to keep the state for each of the game sessions separate from one another. Because many game sessions are typically in progress at the same time on the gaming service and are being accessed by the same arbitration server, a unique session ID needs to be used to discriminate game sessions from each other, and to ensure that each game session is handled independently of all other game sessions. The game session ID can simply be a random number that is generated by a game console, or alternatively, the game session ID can be a sequential or random number that is generated on one of the servers at the gaming service and passed to the game console. As a further alternative, the game session ID can be a concatenation of both a component from the game console and a component provided by a server on the gaming service. In any case, it is critical that the game session ID be unique, or that the probability of two game session IDs being the same for different game sessions be very low for all currently active game sessions. It is likely that a game console serving as a host for a given game session will select and forward the game session ID to all other game consoles that are participating in a current game session before the game consoles are able to register with the arbitration server and begin playing the game session. The same game session ID must be used both during registration and at the time that the game consoles report the results in order for the arbitration server to be able to associate the registration and the results reported with the game session.

At the end of the game session, the arbitration server must apply the predefined rules to determine the results reported by the participants in the game session (if any) that will be used for the official results for the game session. Clearly, the arbitration server cannot wait indefinitely for all parties that originally registered for the game session to submit a report, since one or more game consoles may have disconnected from the game session and will not be submitting a report. Accordingly, when game consoles submit a registration request to the arbitration server before the game session starts, the game software (typically running on the game console acting as the host for the game session) will indicate a predefined time interval by which the game session should be concluded and all reports of the results must be submitted to the arbitration server. If it is necessary for the game session to be played longer than the originally anticipated time period, a game console can submit a request for an extension of the predefined time interval. For example, if the online game is basketball and the game session needs to go into overtime, the game console acting as the host can request an extension of the original predefined time interval to enable the game session to be completed in overtime. In this case, the extended time period will be added to the originally requested time period. Any results reported after the predefined time period (or the extended time period) has lapsed will not be considered by the arbitration server in determining the official results for the game session.

After the game session is concluded, the arbitration process begins. Throughout the games session and the arbitration process, the "state" of each game session is maintained and includes the set of game consoles/players that have registered, the predefined time period to wait before timing out the current game session, and the list of reports received (thus far) from any participating game consoles. The state must be retained in memory by the arbitration server and is updated as new reports are received, until the final game session arbitration has been performed (which occurs either after the predefined time period has lapsed, or after all registered participants in the game session have reported results). The state can be recorded in the memory of the arbitration server, which is generally preferable, or may be retained in storage on a hard drive, or other nonvolatile storage as part of a database, or on another server. The location of the state for the game session is not important so long as the arbitration server can access the state when it needs to make the final arbitration decision.

When the arbitration server analyzes the reports submitted by each of the game consoles for each arbitrated game session in order to determine the final official results for the game session, it will have considerable information about the game session and what, if anything, went wrong with it. Such information can be input to a trust rating system, if the trust rating system is used as a basis for determining the arbitrated official results for subsequent game sessions. The parameters that might be gathered at the end of a game session for input into the trust rating system for each player using a game console include: (1) determining whether a game console punctually sent a report for the game session after having registered for the session; (2) determining whether a majority agreement was achieved on the results reported by each of the game consoles; and, (3) determining that the arbitration server is unable to select official results for the game session because there are no credible reports. Failure to identify official results for a game session might occur if all of the game consoles initially registering for a game session terminated participation in the game session before its completion, for example, so that the players can watch a Super Bowl game or some other event of greater interest that might be occurring at the time of the game session. The arbitration server will also determine if there were conflicting reports, which typically would imply that a network filter was deployed sometime during the game session so that the game consoles were partitioned into two or more non-communicating groups. If any game console transmitted a single packet to the arbitration server using the UDP format, it is likely that the game console was the victim of packet bombing. The arbitration server will also determine if any game console reported a loss of connectivity to another client that reported normally at the end of the game session. Finally, any suspicious activity will be reported to the arbitration server by the online game software executed on the game consoles to indicate whether any of the game consoles appear to be executing modified online game software.

Except for the case in which a game console fails to provide a report, the arbitration server will normally know if something went wrong during the game session, but may not know who actually caused the problem. Consequently, to provide benefit for resolving such problems in the future, the solution is for the arbitration server to degrade the TRF for all players who started participating in the game session. If a report was not submitted by a game console that registered before beginning the game session, it will be necessary to penalize any players using that game console unless a UDP packet was received from the game console that might indicate the game console had sustained a packet bombing attack. Furthermore, in game sessions in which all of the game consoles submit reports that are identical in regard to the results of the game, the TRF of all the players involved should be increased. A preferred embodiment of the present invention uses different counters for each of a plurality of parameters corresponding to various problems or issues that might arise during a game session as identified by the report submitted by each of the game consoles. Preferably, a different TRF is maintained for each different title of online game for each player. Thus, a player may have one TRF determined by the parameters stored in the data for a particular online game title, and an entirely different TRF based on parameters stored in the data for that player in connection with a different online game title.

Although many different schemes might be used for the parameters involved with determining the TRF of a player, the present invention employs nine parameters, $C1$-$C9$. These parameters are defined as follows:

SuccessfulSessionCount ($C1$): The number of normal successful arbitrated game sessions this user played in for this title, where a majority quorum agreed on the game session results.

MinoritySessionCount ($C2$): The number of abnormal but successful arbitrated game sessions in which this user played for this title, where no majority quorum agreed on the game session results, but a minority quorum did agree.

FailedSessionCount ($C3$): The number of failed arbitrated game sessions in which this user played for this title, where not even a minority quorum agreed on the results.

ProblematicSessionCount ($C4$): The number of times this particular user registered in a game session in which some user in the game session reported a loss of connectivity during the game session. Any user in the game session reporting connectivity problems will result in all users in the game session having this counter incremented.

UDPReportCount ($C5$): The number of times this particular user registered in a game session in which some user needed to send a game session report using UDP. Any user reporting using the UDP format (the victim) will result in all users in the game session having this counter incremented, which typically implies that some user in the game session is packet flooding the victim.

DisconnectCount ($C6$): The number of times this particular user registered in a game session but never later reported results for that game session. A "Disconnect" only affects the user that didn't report; all other users are unaffected (except for the fact that the game session might become a Non Majority or failed game session due to many missing reports).

Type1SuspicioustCount (C7): The number of times this particular user registered in a game session that had type 1 suspicious activity reported in the game session.

Type2SuspicioustCount (C8): The number of times this particular user registered in a game session that had type 2 suspicious activity reported in the game session.

Type3SuspicioustCount (C9): The number of times this particular user registered in a game session that had type 3 suspicious activity reported in the game session.

It should be understood that for each session, exactly one of the counters C1-C5 will be incremented. Counters C6-C9 are independent counters that are independently incremented if the situation in a particular game session indicates that it is appropriate to do so. The nature of the type 1, type 2, and type 3 suspicious activity are determined by the game developer, but might include any of the examples noted above, i.e., having an unlimited supply of ammunition, or being able to do things within the game that are inconsistent with the rules governing the game. Also, the counters used in the preferred embodiment are exemplary. Generally, any criteria useful for evaluating the trust that should be given a player participating in an online game might be used in the present invention by an arbitration server to determine the results reported by the game consoles that will be used as the official results for the game session, when there are differences in the reported results.

Also, in a preferred embodiment of the present invention, the counters will be stored with a time stamp to enable the value of the counters to decay over time. Only counter C1 is incremented to positively influence the TRF of a player, while each of the other counters has a negative impact on the value of the TRF. When a player initially starts playing an online game of a specific title, the player is assigned a nominal neutral TRF. As the player participates in more game sessions for that online game title, the TRF will change, becoming more positive as counter C1 is incremented, or becoming more negative if the game sessions involve problems relating to trust so that the other counters are incremented. However, the TRF needs to change over time to accommodate changes in the behavior of a player, or changes in the group of players with whom the player participates in game sessions. If a reduction in a player's TRF was the result of the player frequently playing with another player who consistently cheated, the player who did not cheat should not be penalized indefinitely. In a preferred embodiment, the decay in the TRF (i.e., the decay in a positive or negative TRF) occurs as an exponential function of time. For each negative counter, a ratio for the effect of that counter on the TRF of a player is adjusted based on how large the summation of that counter is for all users for a given online game title.

Furthermore, in a preferred embodiment, a weighting factor is applied to each negative counter. By adjusting the weighting factor and other variables in the relatively complex equation used to determine a TRF for each player, it is possible to fine tune the system over time so that the TRF value for a player represents a relatively valid basis for determining how much trust should be applied to that player in connection with the report of the results submitted by the player. Since the details of the actual equations used for determining the TRF of a player are not particularly important in regard to the overall concept embodied in using a trust rating system in connection with determining the official results of a game session, those details are not presented here. Furthermore, it is contemplated that for each different type of game, the game developer may provide input on how best to determine the TRF for each player participating in a game session for that online game title.

Logic Applied in Carrying Out the Present Invention

The logic involved in carrying out the present invention is implemented both on game consoles (or other client computing devices) that are coupled to the gaming service on which an arbitration server runs, and on the arbitration server. In a preferred embodiment of the present invention, the arbitration of the results reported is only possible for those online game titles that include the machine instructions causing the game console to register the players using it with the arbitration server prior to beginning the game session. In addition, the online game software must cause the game console to report the results of all the players initially participating in the game session at the end of a game session, along with other pertinent details employed in implementing the present invention as explained above, and as further discussed below.

Figure 5A:
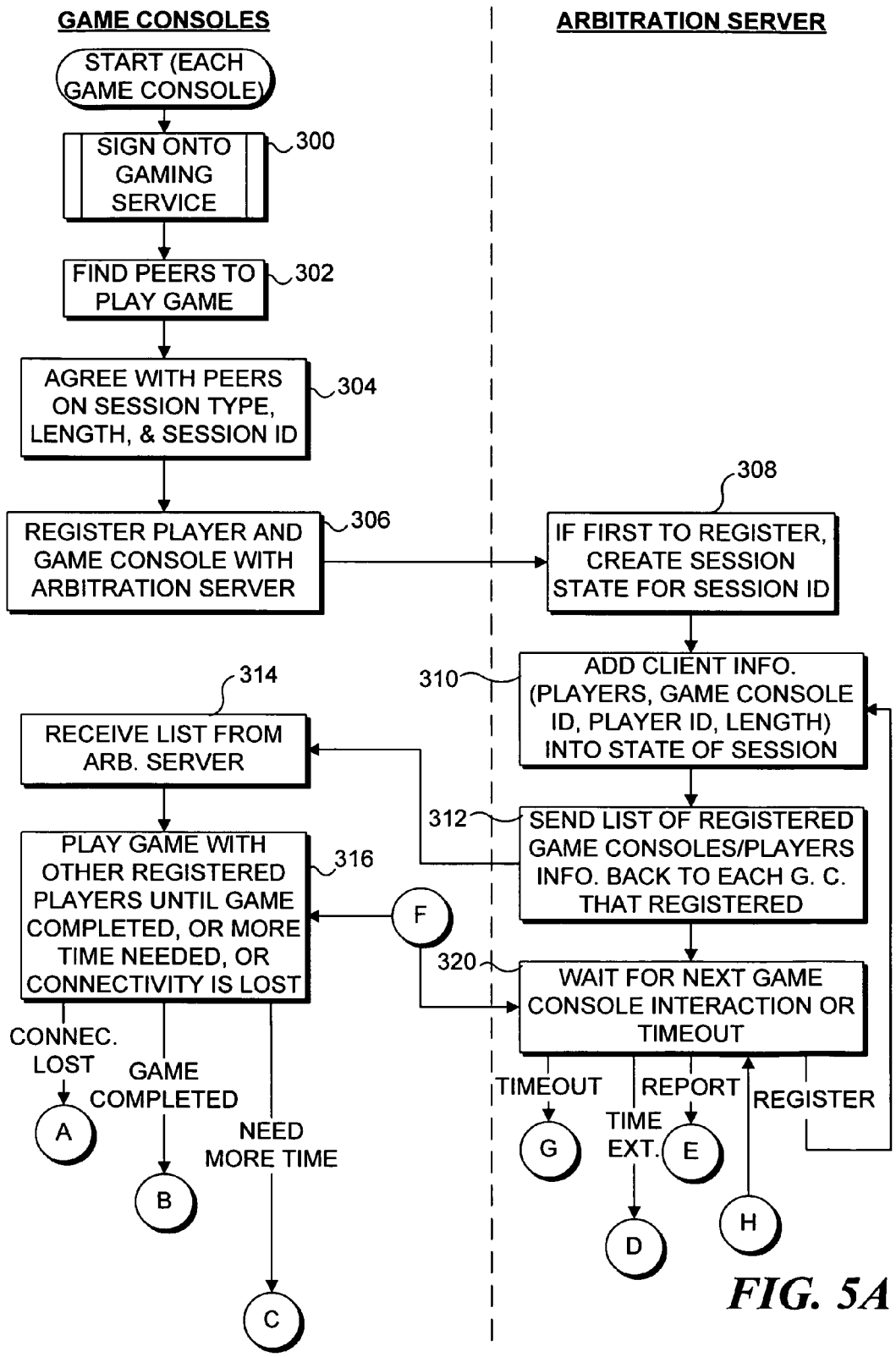
FIGS. 5A and 5B are a flow chart illustrating the steps respectively carried out on each game console and by an arbitration server that determines the official results for a game session.
Figure 5B:
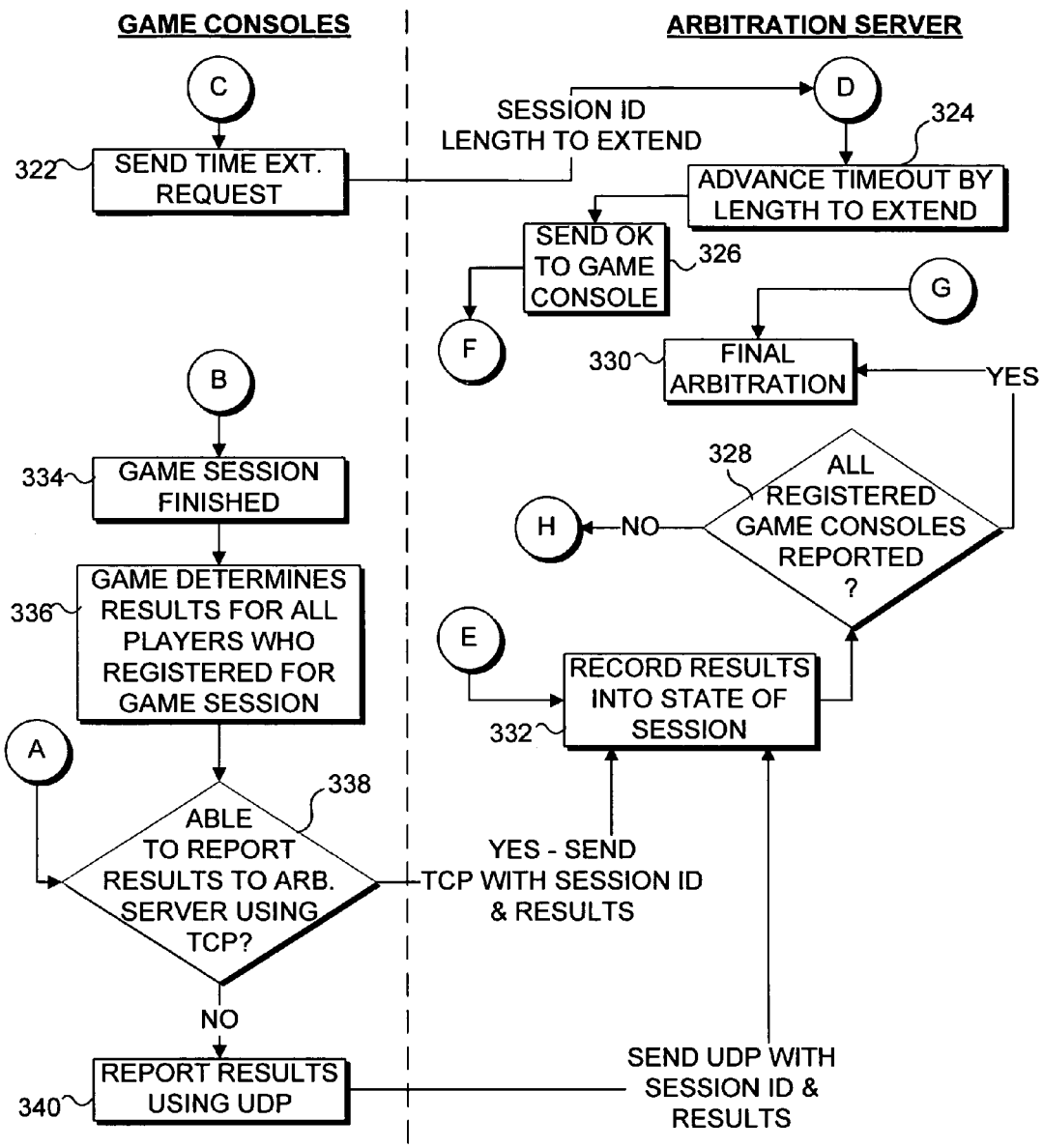

As shown in FIGS. 5A and 5B, the logical steps implemented by each game console participating in an online game session appear on the left side of the Figures, while the logical steps implemented by the arbitration server appear on the right side of the Figures. The logic begins in a step 300 in FIG. 5A, when a game console signs on to the gaming service and is authenticated as a game console permitted to interact with other game consoles using the gaming service. In addition, the players using an online game console that is signing onto the gamine service are authenticated as players who have subscribed to the gaming service. In a step 302, the one or more players using a game console initiate(s) the step of finding peers (i.e., other players) who are interested in playing a specific online game. Next, in a block 304, the player(s) using the game console agree(s) with their peers on other game consoles in regard to the online game session type and the length of play (as appropriate). A session identification (ID) is assigned to the game session by the online game executing on the game console that is serving as a host for the game session. Thereafter, in a step 306, the player or players using the game console and the game console are registered with the arbitration server. This step is required before a game console and the players using it are able to participate in a current game session.

After receiving the registration from a game console, a step 308 indicates that if the current game console is the first to register with the arbitration server, the arbitration server creates a session state associated with the session ID in memory for storing data for the game session concerning its status and the results reported. A step 310 adds client information to the session state. This client information includes an identification of the players who are participating and have registered, the game console ID for each of the game consoles being used by the players, a player ID for each of the players, and the length of the game session, which is provided by the online game executing on the game console being used by the host for the game session.

A step 312 then sends a list of the registered game consoles and players using the game consoles back to each game console that has registered for the current game session to ensure that each game console is aware of the players and game consoles initially participating in the game session, for use in reporting the results after the game session is concluded. At a step 314, this list is received from the arbitration server by each game console. Next, in a step 316, the game consoles each begin executing the online game to enable play of the game with the other players who have registered with the arbitration server. The play between registered players continues unless action is required in response to one of three events; these events include playing the game until it is completed, determining that more time is required to complete the game than initially determined, and determining that connectivity with other peers (i.e., players who are using other game consoles) has been lost.

At any time during the game session, the game software executing on a game console may determine that it is no longer able to communicate with one or more other game consoles. If so, the logic continues to a decision step 338 (FIG. 5B), through connectors A. The determination in decision step 338 is discussed below. If the game has been completed, the logic continues to a step 334 (FIG. 5B) through connectors B. Step 334 indicates that the game session is finished. If more time is needed to complete the current game session, the logic continues to a step 322, which is shown in FIG. 5B, through connectors C. As noted above, additional time may be required in certain games if it is necessary to go into overtime to determine a winner. For example, an overtime session may be needed if the online game is basketball and the scored is tied at the end of the normal game period. Step 322 provides for the game console (typically the game console serving as the host) sending a time extension request to the arbitration server indicating the desired amount of time by which the session ID length should be extended.

Referring to FIG. 5B, following step 334, a step 336 indicates that the online game software executing on the game console determines the results for all players participating in the game session. Decision step 338 determines if a game console is able to report the results to the arbitration server using the preferred TCP format. Referring back to FIG. 5A, it was noted above that in step 316, if connectivity has been lost with the other players, a game console will also proceed to decision step 338 through connectors A. In the event that the game console is unable to report results or if communication has been lost with other players, a step 340 provides for reporting the results using a single UDP packet, which can successfully be transmitted, even if a player's game console is being packet bombed at the time. Accordingly, step 340 enables a game console that may be packet bombed to provide at least an indication to the arbitration server that packet bombing may have occurred, since the game software has recognized a problem in communicating either with other players or in reporting results to the arbitration server using the more preferred TCP format. The single packet transmitted using the UDP format includes a session ID and the results (if it is possible to include the results within a single packet) as perceived by the online game software executing on the game console thus reporting.

In most cases, a player's game console will not be packet bombed, and the response to decision step 338 will be affirmative, so that the game software executing on the game console is able to cause the game console to successfully transmit the session ID and the results of the game to the arbitration server for all players participating as perceived by the game console using the TCP format. A step 332 records the results into the state of the session as they are received from each game console.

As noted above, if a request to extend the time or length of play of the game has been transmitted to the arbitration server in a step 322, a step 324 increases the time by the requested length to extend. If another request to extend the time of the online game session is transmitted because of a further need to do so, the arbitration server will again advance the time out by that additional length to extend in step 324. A step 326 then sends an OK back to the game console that requested the additional time (through connectors F), which is received at step 316 (in FIG. 5A).

In step 332, results that are reported are recorded into the state of the game session. The process then continues with a decision step 328, where the arbitration server determines if reports have been received from all of the original participants in the game session. If so, a step 330 provides for the arbitration server to carry out the final arbitration based on the results that were reported by all participants. Alternatively, if reports have not been received from all of the participants who registered for the online game session, the logic returns to a step 320 (FIG. 5A), to wait for a next game console interaction or timeout to occur.

Referring back to FIG. 5A, following step 312, the arbitration server waits for the next game console interaction or for the time out indicating that the time set (or as extended) has finally lapsed. If the time out has lapsed, the arbitration server does not wait any further and the final arbitration logic of step 330 (FIG. 5B) is implemented by the arbitration server, through connectors G. However, if an extension of time has been requested, the logic continues (through connectors D) with step 324, as already explained. If a report has been made to the arbitration server, the logic proceeds through connectors E, with step 332 in FIG. 5B, wherein the arbitration server records the results reported into the session state, as discussed above. The final type of interaction with a game console in step 320 occurs when a player registers for the game session, causing the logic to loop back to step 310 in FIG. 5A.

Figure 6:
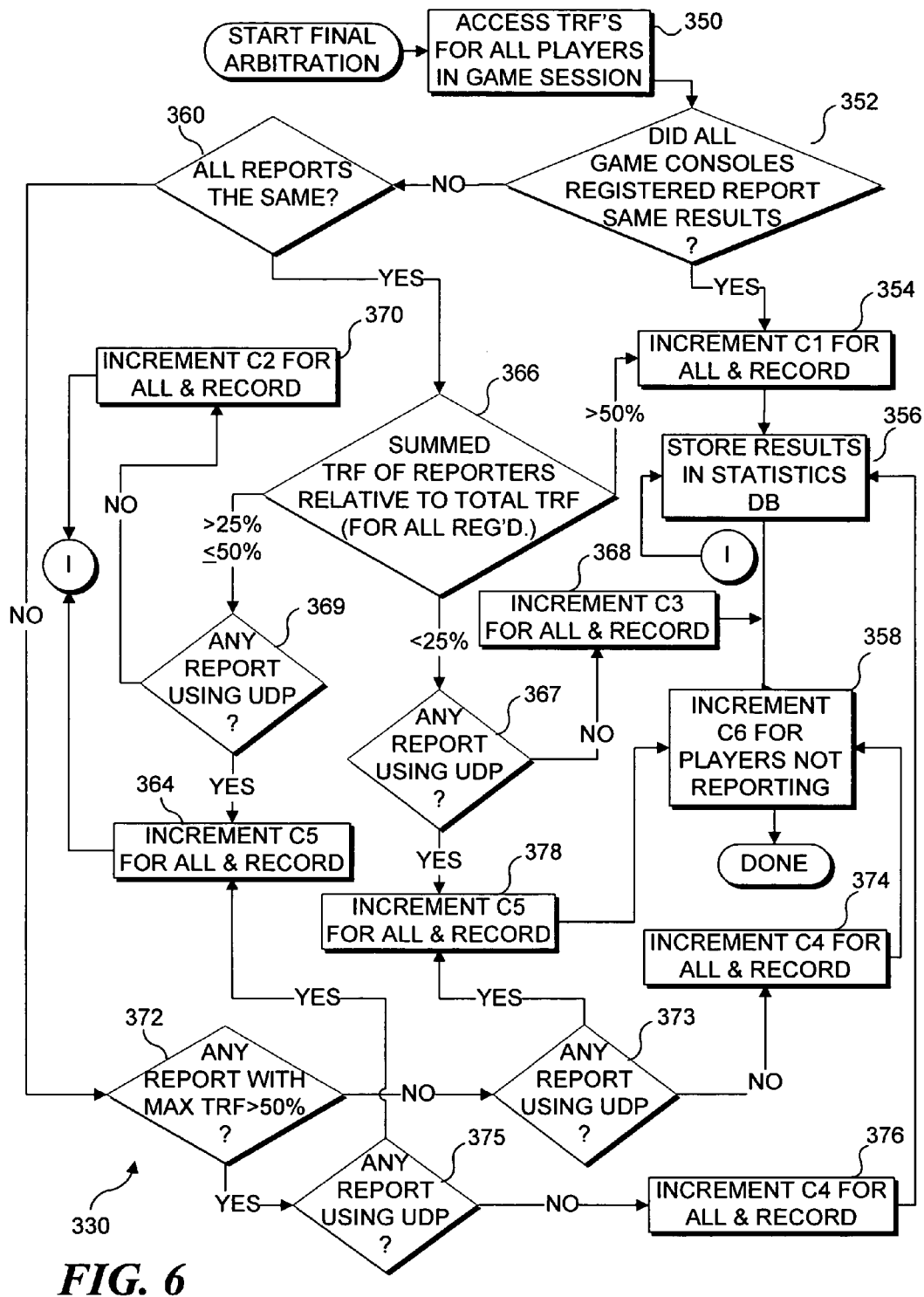
FIG. 6 is a flow chart illustrating the logic employed in applying the arbitration rules for determining the official results and updating data for each player participating in a game session to reflect issues identified in the results reported by the game consoles.

Further details of the logic implemented for the final arbitration of the results that were reported in step 330, to determine the official results for the game session, are illustrated in FIG. 6. As shown therein, the logic starts at a step 350 with the arbitration server accessing the TRFs for all players in the current game session. A decision step 352 determines if all of the game consoles that initially registered to participate in the game session reported the same results. If so, a step 354 increments counter C1 for all of the players and records their reported results in the session state. Next, a step 356 stores the results as the official results for the game session in the statistics database. A step 358 then increments counter C6 for any players not reporting (which in this case, does not apply) and records the results in the data maintained for each of the players for this online game title. Thereafter, the logic is concluded.

Returning back to decision step 352, if all of the game consoles that registered do not report the same results, a decision step 360 determines if all of the reports are the same. If so, the logic proceeds to a decision step 366. Decision step 366 determines if the sum of the TRFs for all reporting players relative to the total of the TRFs for all the players who originally registered is in one of three different relationships. It should be noted that decision step 366 is only reached if the reports received were consistent, but at least one player (and the game console used by that at least one player) who registered did not complete the game session. If the sum of all the TRF values for the players that did report is greater than 50% of the total of the TRF values for all of the players who initially registered for the game session (i.e., forming a majority quorum), the logic proceeds to step 354, which increments the counter C1 for all of the players and records the results in the player data for all players who reported. In this case, it will be assumed that the one or more players who has not finished the game session simply decided to drop out because they were not doing well and not as a result of any other cheating activity by players who did finish. The results of the majority quorum who reported are then used for the official results stored in the statistics database in step 356.

Referring back to decision step 366, if the total of the TRFs for all of the players who reported is greater than 25% but less than or equal to 50% of the total TRF for all of the players who initially registered (i.e., forming a minority quorum), a decision step 369 determines if any game console reported results using a UDP packet. As noted above, the UDP format is less preferred and will only be used to submit a single packet if the game software executing on the game console determines that the more preferred TCP format cannot be used for communication with the arbitration server. Thus, any game console reporting using the UDP format is indicating that another player may have packet bombed the game console so reporting. If at least one game console reported using a UDP packet, a step 364 increments counter C5 for all of the players in the game session and records the results in the player data. The logic proceeds to step 356 through connectors I. However, if no game console reported with a UDP packet, a step 370 increments counter C2 for all of the players who initially registered and records the results in the player data. Thereafter, the logic again returns to step 356 through connectors I to use the results reported by the minority quorum as the official results for the game session that are stored in the statistics database.

Finally, if the sum of the TRF values for all of the players reporting is less than 25% of the total TRF value for all of those who registered in decision step 366, a decision step 367 again determines if any report was made using a UDP packet and if not, a step 368 increments counter C3 for all of the players and records the results in the player data. Thereafter, the logic proceeds to step 358, which increments the counter C6 and records the counter values for the players in the data. In this case, arbitration server will not record any official result for the game session, since the reported results are inconclusive. Similarly, if an affirmative result is returned from decision step 367, the logic continues with a step 378, which increments counter C5 for all of the players and records the revised counter values in the data for the players. Following step 378, a step 358 provides for incrementing counter C6 for all of the players and recording the incremented counter values for all of the players in the player data. Again, no official result is recorded for the game session.

Returning back to decision step 360, if all reported results were the not the same, and one or more game consoles did not report, a decision step 372 determines if any report was received wherein the sum of the TRF values for all of the players submitting a report of the results was greater than 50% of the total of the TRF values for all of the players who originally registered. If not, a decision step 373 determines if any report was received as a UDP packet. If a UDP packet was not used for a report, a step 374 increments the counter C4 for all of the players who registered and records the results in the player data. The logic then returns to step 358, which increments the counter C6 for players not reporting and records the results in the player data. In this case, no official result can be determined for the game session, just as was the case when step 358 was reached from step 368. If the result in decision step 373 is affirmative, step 378 increments counter C5 and the logic again proceeds to step 358 without recording an official result.

If the result in decision step 372 is affirmative, a decision step 375 again determines if any report was made using a UDP packet. If not, a step 376 increments counter C4 and records the results for all of the players who registered in the player data, before proceeding with step 356. If a report using a UDP packet was received in decision step 375, the logic proceeds to step 364, where counter C5 is incremented for all players. The logic again proceeds to step 356 through connectors I. At step 356, the arbitration server will use the results reported by the group of players which had a sum of TRF values greater than 50% of the total of the TRF values for all of the players who registered, as the official results stored in the statistics database, for the game session.

It will be understood that various other approaches can be used for establishing the values of the counters or even establishing a trust value for each of the players participating in a game session, depending upon any incident that occurred during the game, or failures of the players to conclude a game session having initially registered for it. Accordingly, the approach used in FIG. 6 is simply exemplary and is not intended in any way to be limiting of the present invention.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. In a computing environment comprising at least one online game service and a plurality of online game players, a method for determining an official result for an online game session when the validity of the official result is in dispute, the method comprising the steps of the online game service:
  (a) automatically establishing a trust rating for each player connected to an online gaming service and participating in an online game session where the session involves a disagreement about the official results of the session, the trust rating being based on information associated with each player collected during the session, the trust rating being further configurable to be updatable when players participate in successive online game sessions;
  (b) receiving alleged results for the online game session from the computer systems of the online game players participating in the online game session; and
  (c) determining the official result for the online game session, based on a function of the alleged online game session results reported by the players' computer systems and the trust ratings of each player participating in the online game session as indicated by the online game service based on prior involvement in online game sessions where the session involved a dispute over the official results.

2. The method of claim 1, further comprising the steps of:
  (a) requiring results for all of the players participating in a game session to be reported by each player participating in the game session; and
  (b) increasing the trust ratings of all of the players in the game session, if the same results are reported by all of the participants in the game session.

3. The method of claim 1, further comprising the step of maintaining a separate trust rating for a player for each online game title in which the player participates.

4. The method of claim 1, wherein the step of establishing the trust rating comprises the step of changing a value of at least one of a plurality of parameters in response to a condition detected during a game session or after the game session is completed.

5. The method of claim 4, wherein the plurality of parameters for a player are defined by a corresponding plurality of different counters, and wherein the step of changing the value of at least one of the plurality of parameters comprises the step of incrementing or decrementing the value of at least one of the plurality of counters.

6. The method of claim 5, further comprising the step of applying a weighting factor to the values of the counters stored for a player in determining the trust rating of the player.

7. The method of claim 6, further comprising the step of applying a greater weighting factor for at least one of the values of the plurality of counters in connection with results of a tournament game session than in connection with the results of a game session that is not part of a tournament.

8. The method of claim 1, further comprising the step of reducing the trust rating for a player who starts a game session, but does not complete the game session.

9. The method of claim 1, further comprising the step of reducing the trust rating of all players in a game session if any player sends a signal to the gaming service using a less preferred protocol indicating that the player is unable to communicate with the gaming service using a signal having a preferred protocol, because the player may be experiencing packet flooding by another player.

10. The method of claim 9, wherein the step of updating the trust rating of a player comprises the step of improving the trust rating of all players participating in the game session if all of the following are true:
(a) a trusted majority of players participating reported results for the game session;
(b) all of the results reported by the majority are in agreement; and
(c) no player has communicated with the gaming service using the signal having the less preferred protocol to indicate that the player was unable to communicate with the gaming service using the signal having the preferred protocol.

11. The method of claim 10, wherein if less than the trusted majority of players reports results, the trust rating of all of the players in the game session is reduced.

12. The method of claim 1, wherein if less than a predefined portion of the players participating in a game session report results, the trust rating of all of the players who were originally participating in the game session is reduced.

13. The method of claim 1, further comprising the step of changing the trust rating of a player as a function of time, so that more recent updates have a greater weight in modifying the trust rating than previous updates.

14. The method of claim 1, wherein a majority quorum of a game session is determined to exist, if a set of players report the same results, and the sum of the trust ratings of said players is greater than a predefined portion of the total trust rating for all players in the game session, so that results reported by a majority quorum are used for the official result for the game session.

15. The method of claim 14, wherein a non-majority quorum of a game session is determined to exist, if a set of players report the same results, and the sum of the trust ratings of said players is less than the predefined portion of the total trust rating for all players in the game session, but greater than a lesser predefined portion of the total trust rating for all players in the game session, so that the results reported by a highest non-majority quorum are used for the official results when no majority quorum exists.

16. A memory medium on which machine executable instructions are stored for carrying out the steps of claim 1.

17. A server computing device at an online gaming service, said server computing device being used for determining an official result for an online game session when the validity of the official result is in dispute, the server computing system comprising:
(a) a memory in which machine instructions are stored;
(b) a network interface adapted to communicate with clients over a network to facilitate play of online games;
(c) a processor coupled to the memory and to the network interface, said processor executing the machine instructions stored in the memory to carry out a plurality of functions, including:
(i) automatically establishing a trust rating for each player connected to an online gaming service and participating in an online game session where the session involves a disagreement about the official results of the session, the trust rating being based on information associated with each player collected during the session, the trust rating being further configurable to be updatable when players participate in successive online game sessions;
(ii) receiving alleged results for the online game session from the computer systems of the online game players participating in the online game session; and
(iii) determining the official result for the online game session, based on a function of the alleged online game session results reported by the players' computer systems and the trust ratings of each player participating in the online game session as indicated by the online game service based on prior involvement in online game sessions where the session involved a dispute over the official results.

18. The server of claim 17, wherein each player participating in a game session is required to report results for all of the players participating in the game session; and wherein the machine instructions executed by the processor further cause the processor to increase the trust ratings of all of the players in the game session, if the same results are reported by all of the participants in the game session.

19. The server of claim 17, wherein the machine instructions executed by the processor further cause the processor to maintain a separate trust rating for a player for each online game title in which the player participates.

20. The server of claim 17, wherein the machine instructions executed by the processor further cause the processor to change a value of at least one of a plurality of parameters in response to a condition detected by the server computing device during a game session or after the game session is completed.

21. The server of claim 20, wherein the plurality of parameters for a player are defined by a corresponding plurality of different counters; and wherein the machine instructions executed by the processor further cause the processor to change the value of at least one of the plurality of parameters by incrementing or decrementing the value of at least one of the plurality of counters.

22. The server of claim 21, wherein the machine instructions executed by the processor further cause the processor to apply weighting factor to the values of the counters stored for a player in determining the trust rating of the player.

23. The server of claim 22, wherein the machine instructions executed by the processor further cause the processor to apply a greater weighting factor for at least one of the values of the plurality of counters in connection with results of a tournament game session than in connection with the results of a game session that is not part of a tournament.

24. The server of claim 17, wherein the machine instructions executed by the processor further cause the processor to reduce the trust rating for a player who starts a game session, but does not complete the game session.

25. The server of claim 17, wherein the machine instructions executed by the processor further cause the processor to reduce the trust rating of all players in a game session if any player sends a signal to the gaming service using a less preferred protocol, indicating that the player is unable to communicate with the gaming service using a signal having a preferred protocol, because the player may be experiencing packet flooding by another player.

26. The server of claim 25, wherein the machine instructions executed by the processor further cause the processor to improve the trust rating of all players participating in the game session if all of the following are true:
  (a) a trusted majority of the players participating reported results for the game session;
  (b) all of the results reported by the majority are in agreement; and
  (c) no player has communicated with the gaming service using the signal having the less preferred protocol to indicate that the player was unable to communicate with the gaming service using the signal having the preferred protocol.

27. The server of claim 26, wherein if less than the trusted majority of players reports results, the machine instructions executed by the processor further cause the processor to reduce the trust rating of all of the players in the game session.

28. The server of claim 17, wherein if less than a predefined portion of the players participating in a game session reports results, the machine instructions executed by the processor further cause the processor to reduce the trust rating of all of the players who were originally participating in the game session.

29. The server of claim 17, wherein the machine instructions executed by the processor further cause the processor to change the trust rating of a player as a function of time, so that more recent updates have a greater weight in modifying the trust rating than previous updates.

30. The server of claim 17, wherein the machine instructions executed by the processor further cause the processor to determine that a majority quorum of a game session exists, if a set of players report the same results, and the sum of the trust ratings of said players is greater than a predefined portion of the total trust rating for all players in the game session, so that results reported by a majority quorum are used for the official result for the game session.

31. The server of claim 30, wherein the machine instructions executed by the processor further cause the processor to determine that a non-majority quorum of a game session exists, if a set of players report the same results, and the sum of the trust ratings of said players in a game session who report results is less than the predefined portion of the total trust rating for all players in the game session, but greater than a lesser predefined portion of the total trust rating for all of the players in the game session, so that the results reported by a highest non-majority quorum are used for the official results when no majority quorum exists.

32. A method for establishing a trust rating for a player of an online game on a gaming service, said gaming service using the trust rating to determine a level of trust to apply to results of a game session reported by the player in determining the official result of an online game session, comprising the steps of:
  (a) detecting one or more players participating in an online game session;
  (b) receiving the alleged results of the game session from each player participating in the online game session;
  (c) determining that the received results are undisputed, each player's computer system having submitted the same online game session results; and
  (d) in response to the determination, increasing the trust rating of each of the players in the online game session.

33. The method of claim 32, further comprising the step of reducing the trust rating of a player who starts a game session, but does not complete the game session.

34. The method of claim 32, wherein the gaming service determines that at least one player in a game session is cheating by packet flooding another player to prevent the other player from communicating with the gaming service and with other players.

35. The method of claim 34, wherein the gaming service determines that at least one player is packet flooding the other player if the other player in the game session sends a message to the gaming service using a less preferred protocol, because the other player is unable to communicate with the gaming service using a more preferred protocol, communication using the less preferred protocol being able to reach the gaming service even if the other player is subject to the packet flooding.

36. The method of claim 32, wherein the gaming service determines that at least one player is using a filter to block communications with at least one other player.

37. A memory medium storing machine readable instructions for carrying out the steps of claim 32.

* * * * *